United States Patent
Au et al.

(10) Patent No.: US 9,338,370 B2
(45) Date of Patent: May 10, 2016

(54) VISUAL SYSTEM HAVING MULTIPLE CAMERAS

(71) Applicant: Honeywell International Inc., Morristown, NJ (US)

(72) Inventors: Kwong Wing Au, Bloomington, MN (US); Sharath Venkatesha, Golden Valley, MN (US)

(73) Assignee: Honeywell International Inc., Morris Plains, NJ (US)

( * ) Notice: Subject to any disclaimer, the term of this patent is extended or adjusted under 35 U.S.C. 154(b) by 659 days.

(21) Appl. No.: 13/668,728

(22) Filed: Nov. 5, 2012

(65) Prior Publication Data
US 2014/0125760 A1    May 8, 2014

(51) Int. Cl.
*H04N 5/225* (2006.01)
*H04N 5/247* (2006.01)
*H04N 5/232* (2006.01)

(52) U.S. Cl.
CPC ........... *H04N 5/247* (2013.01); *H04N 5/23212* (2013.01); *H04N 5/23238* (2013.01)

(58) Field of Classification Search
CPC   H04N 5/247; H04N 5/23212; H04N 5/23238
See application file for complete search history.

(56) References Cited

U.S. PATENT DOCUMENTS

| | | | |
|---|---|---|---|
| 5,657,073 A | 8/1997 | Henley | |
| 5,978,017 A | 11/1999 | Tino | |
| 5,991,015 A * | 11/1999 | Zamel | G01B 11/272 219/121.61 |
| 6,310,650 B1 | 10/2001 | Johnson et al. | |
| 6,377,306 B1 | 4/2002 | Johnson et al. | |
| 8,896,671 B2 * | 11/2014 | Jayaram | H04N 5/2253 348/218.1 |
| 8,956,396 B1 * | 2/2015 | Friend | A61N 5/06 607/88 |
| 2010/0149073 A1 * | 6/2010 | Chaum | G02B 27/0093 345/8 |
| 2012/0050493 A1 | 3/2012 | Ernest et al. | |
| 2013/0038510 A1 * | 2/2013 | Brin | G02B 27/017 345/8 |
| 2013/0127980 A1 * | 5/2013 | Haddick | G06F 3/013 348/14.08 |

* cited by examiner

*Primary Examiner* — Sath V Perungavoor
*Assistant Examiner* — Janese Duley
(74) *Attorney, Agent, or Firm* — Schwegman, Lundberg & Woessner, P.A.

(57) ABSTRACT

A visual system including a near-to-eye display supported by a frame adapted to be worn by a user such that each display is positioned proximate an eye of a wearer, a set of cameras supported by the frame, the cameras having different overlapping fields of view, and a processor coupled to receive images from the cameras and adapted to integrate and transform images from the set of cameras to provide a mosaic image for viewing on the display having a wider field of view than an individual camera provides.

16 Claims, 4 Drawing Sheets

VISUAL SYSTEM HAVING MULTIPLE CAMERAS

BACKGROUND

Wearable near-to-eye display system for workers have long seemed to be on the verge of commercial success, but to date, acceptance has been limited. The main reason is that the images presented to the human brain through the eyes are not as natural as the images sensed by the eye causing eye strain and/or nausea. Several factors contribute to this unnatural sensation.

First factor is tunnel vision. Human eyes cover a wide field of view, a total binocular field of view (FOV) of about 120 degrees horizontal (180 degrees forward facing horizontal) by 130 degrees vertical. Normal camera covers up to 60 degrees FOV. Optical design to replicate human visual FOV is possible but creates a very bulky and heavy system which is not suitable for a wearable display. Therefore existing commercial off the shelf (COTS) wearable, one-camera, near-the-eye display systems offer a narrower FOV and the user suffers with tunnel vision.

Another factor causing unnatural sensation includes incorrect focus of the scene. Human eyes are capable of instantaneously switching focus on objects in the scene from far field to near field. Autofocus camera exists which provide a solution. Such cameras, however, have complex lens systems and drivers. Again the requirements on size, weight and power make the autofocus feature not-suitable for a wearable display. Fixed focus cameras yield blurry images when the subject of interest is beyond the depth of field of the current focus distance.

Another factor that influences the acceptance of a wearable display system is incorrect viewing perspective. The interpupillary distance (IPD) of adults ranges from 5.5 to 7.0 cm. If the cameras are placed at locations other than the center of the pupils, the acquired images will have a different perspective than that of the eyes. This different perspective creates an impression/sensation that the eyes are stretching or squinting all the time.

SUMMARY

A visual system includes a near-to-eye display supported by a frame adapted to be worn by a user such that each display is positioned proximate an eye of a wearer, a set of cameras supported by the frame, the cameras having overlapping fields of view, and a processor coupled to receive images from the cameras and adapted to integrate and apply corrective transformation on images from the set of cameras to provide a fused, corrected image for the display having a wider field of view than an individual camera provides. The visual system can be monocular, binocular, binocular or 3D.

Various methods of receiving images and integrating, transforming the images for a near-to-eye display provide an image having a wider field of view than that provided by an individual camera.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that structural, logical and electrical changes may be made. The following description of example embodiments is, therefore, not to be taken in a limited sense, and the scope is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of embedded processor.

Figure 1A:
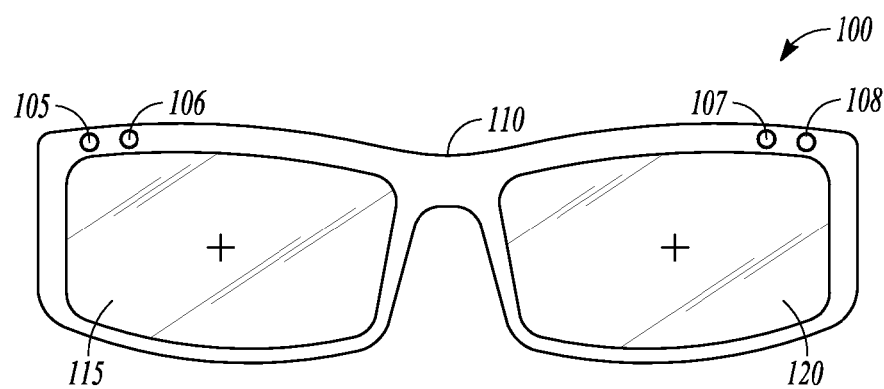
FIGS. 1A and 1B are front perspective diagrams of a reality vision system according to two example embodiments.

FIG. 1A is a block diagram of a reality viewing system 100 viewed as they would appear to someone looking at a wearer of the viewing system 100. Multiple cameras 105, 106 and 107, 108 are integrated into a wearable frame 110 in various embodiments. Each camera may cover a portion of a wide field of view from the perspective of the wearer, which may then be pieced together for viewing on displays 115, 120 supported by the wearable frame 110. Micro high-resolution cameras may be used. Such cameras are small, light-weight, low-power, inexpensive and ubiquitous, and can fit onto the wearable frame 110.

The cameras are separated into two sets corresponding to each eye and corresponding display. In one embodiment, a first set of cameras 105 and 106 captures two adjacent and overlapping fields of view for right eye display 115. Similarly, cameras 107, 108 capture two adjacent and overlapping fields of view for left eye display 120. As shown in reality viewing system 100, the cameras may be located near the outsides of the frame and above the eye. The sets of cameras could also be supported further apart than a nominal interpupillary distance.

Figure 1B:
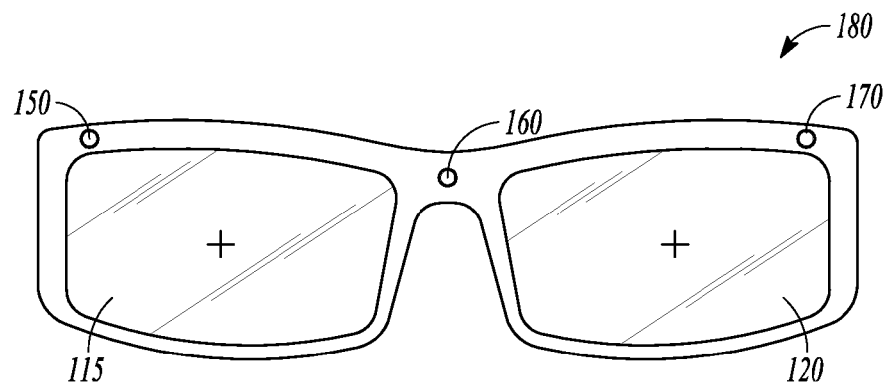

In another embodiment illustrated in FIG. 1B, a reality viewing system 180 has three cameras, 150, 160, 170 that are supported by a wearable frame 110. The first set of cameras consists of cameras 150, 160 capturing images for right eye display 115. The second set of cameras consists of cameras 160, 170 capturing images for left eye display 120. Images captured by camera 160 are split and shared by the left and right displays.

In a further embodiment also illustrated in FIG. 1B, cameras 150 and 170 are far field of view cameras and camera 160 of near field of view type. The displays 115 and 120 may show images from 150 and 170 respectively when the user is looking at far field. Both the displays 115 and 120 may show the images from camera 160 when the user is looking at near field.

Figure 2:
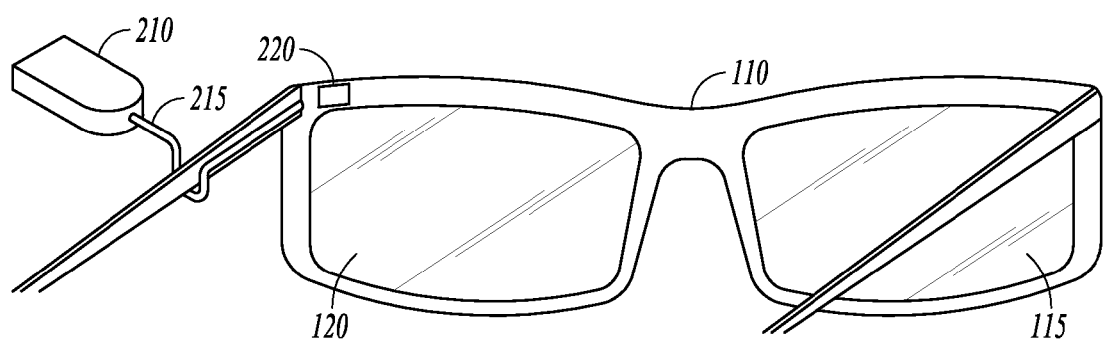
FIG. 2 is a block back perspective diagram of a reality vision system according to an example embodiment.

FIG. 2 illustrates a view of the reality viewing system 100 facing the eyes. A processor 210 is coupled to the cameras and to the displays 115 and 120 by cable 215 to provide processing for camera images and displaying the processed images on the displays. The cable may be as long as desired to allow support of the processor either on the frame 110 or on another part of the body of the wearer, such as shirt or pants pocket, or clipped to a belt.

In various embodiments, the displays 115 and 120 are implemented as micro OLED displays, flexible OLED displays, LCD, 3LCD or LCoS display technologies. These displays could have FOV and resolution that are different from that of the cameras. Transformations are applied to the video images assuring the compatibility between the displays and cameras.

In a further embodiment, a sensor 220, such as an MEMS accelerometer and/or camera to provide orientation of the frame and images of the eye of the user including a pupil position are provided. Eye and pupil position may be tracked using information from the sensor 220. The sensor 220 may provide information regarding where the user is looking, and images may be processed based on that information to provide a better view through the display. In one embodiment, camera image selection or sub-image region of interest selection and image processing may be a function of information provided by the sensor 220 or multiple sensors represented at 220 as described in further detail below.

The system 100 can be monocular, biocular, binocular or three dimensional (3D). For the monocular system, a fused video stream is fed to one display for the left or right eye. For the biocular system, a fused stream is fed to displays for the left and right eyes. For a binocular system, two fused video streams are fed to the left and right displays. The left video stream is from a set of cameras configured on the left side of the frame 110. The right video stream is from a similar set of cameras configured on the right side of the frame 110. The same processor 210 or another processor may perform the same fusion, corrections and transformation processes. In case of 3D processing, the processor 210 has the capability to generate a 3D video stream in full frame packing or anaglyph format required by the 3D capable near-to-eye display system, using the video feed from multiple cameras. Processor 210 receives the acquired video stream from each camera. The processor performs corrective transformation which processes images from a set of cameras and outputs a fused, corrected video stream to the designated display.

Figure 3:
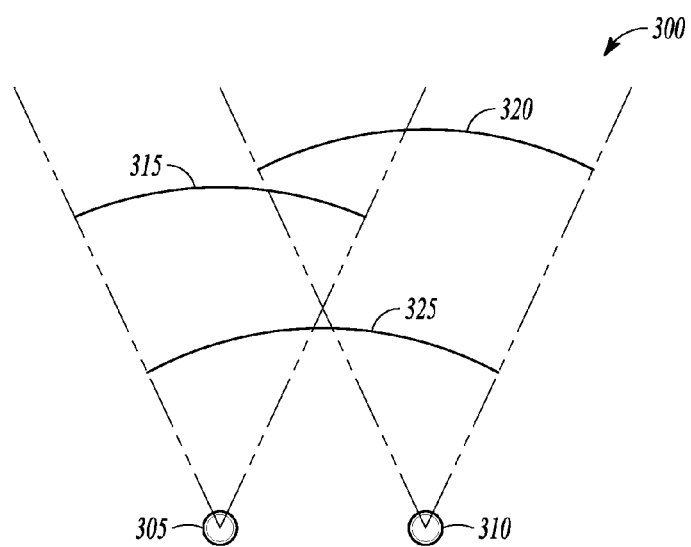
FIG. 3 is a diagram illustrating overlapping fields of view of a set of cameras according to an example embodiment.
Figure 9:
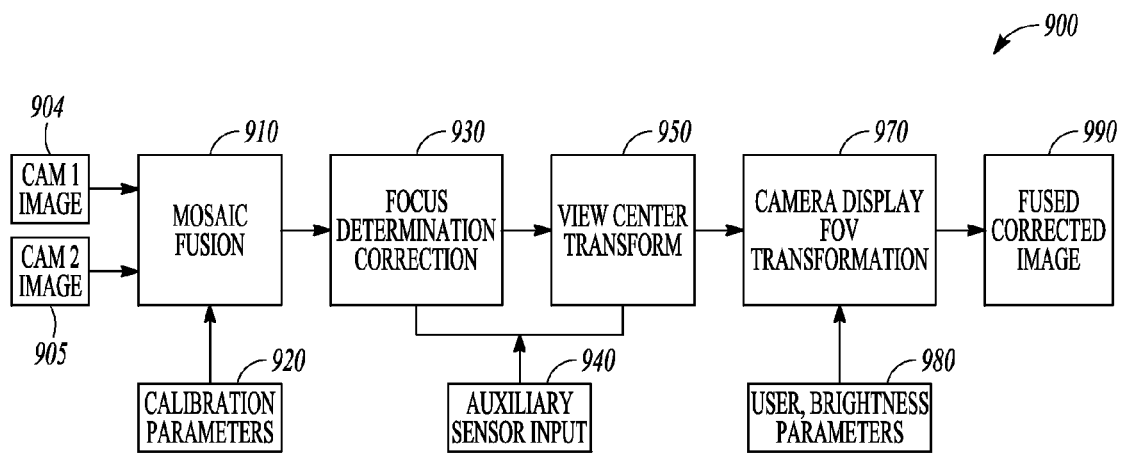
FIG. 9 is a block diagram illustrating the corrective transformation according to an example embodiment.

FIG. 9 is a block diagram of the corrective transformation 900. Camera 1 image 904 and camera 2 image 905 are inputs to an image mosaic fusion block 910, which unifies the images into an image that has a wider field of view than any of the two input images. Calibration and alignment parameters 920, which could be saved from calibration and alignment processes during production, may be used to simplify and speed up the process in Image Mosaic Fusion 910. Focus Determination and Correction 930 determines the focus of the viewing system based on sharpness comparison in the overlapping FOV pixels between the two images 904, 905. The need to correct the focus of an image arises when the cameras do not focus at the same distance. If the sharpness of overlapping field of view (FOV) pixels in image 904 is higher than that of image 905, then the focus of image 905 is adapted to that of 904. Else the focus of image 904 is adapted to that of image 905. When an auxiliary sensor input 940 from sensor 220 is available, it can be used to aid the evaluation of focus. In visual system 180, the center camera 160 may have a near field of view, while the cameras 150 and 170 may have far field of view. In this embodiment, when the focus is determined to be near field, the image from camera 160 may have a sufficient FOV for viewing and thus could be presented for viewing. View Center Transformation 950 transforms the output image of 930 such that the view center of the image co-inside with the pupil center of the eye. Depending on the placement of the cameras, the transformation can be perspective, affine, or translational that corrects the disparity due to rotation, translation, scaling, shear and depth. The auxiliary sensor input 940 may be used to estimate the position of the pupil center. In further embodiments, the centers field of view of the two video streams could be adapted to fit the inter-pupillary distance of the user. Camera-Display FOV transformation 970 adapts the FOV of the fused image to the FOV of the display such that viewing the display has the same experience as naturally viewing the scene having the same FOV and sizes of objects. An image resize operation is often used. Based on the User, Brightness Parameters 980, Camera-Display FOV transformation 970 also performs brightness adjustment offering comfortably bright image even though the actual scene is too dim or too bright. In further embodiments, Camera-Display FOV transformation 970 applies image enhancements such as contrast enhancement, noise removal, low pass or band pass filtering, smoothing based on user defined parameters 980 or scenario specific requirements. The output of the corrective transformation 900 is a fused, corrected image 990. Not all processes in the corrective transformation 900 are necessary conditioned on the image inputs, characteristics and configuration of the visual system, cameras and displays. Experts in the field also aware that the order of some processes can be interchanged and some processes can be combined achieving speedy execution. FIG. 3 is a diagram 300 illustrating overlapping fields of view of a set of cameras 305 and 310. Camera 305 has a field of view of approximately 40 degrees in one embodiment as indicated by arc 315. Adjacent camera 310 has a field of view of approximately 40 degrees as indicated by arc 320. When the views of the cameras are mosaicked together, the effective field of view indicated by arc 325 is wider than the individual fields of view of each camera. In further embodiments, more cameras may be included in each set of cameras to further widen the field of view. The cameras may also have varying fields of view, either more or less than 49 degrees, and all cameras need not have the same field of view. The overlap in the fields of view of adjacent cameras may also be varied, but in some embodiments should be enough to ensure that the mosaicking of the views can be suitably performed to provide a desired mosaic image quality.

Figure 4:
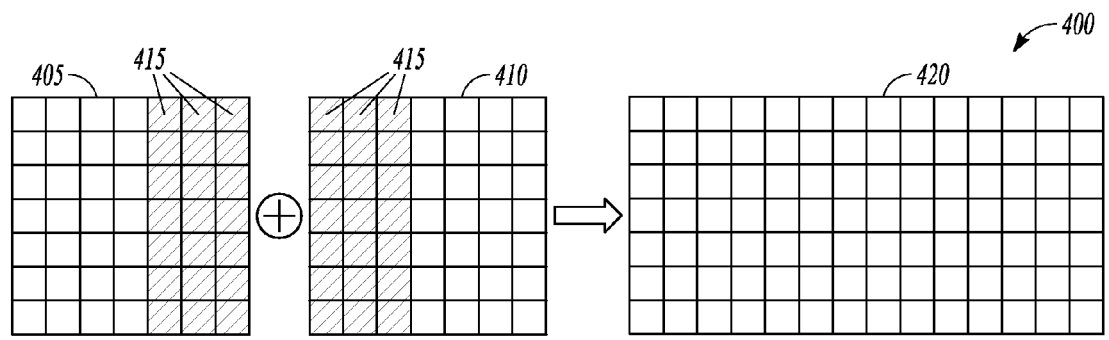
FIG. 4 is a block diagram illustrating camera images to be combined according to an example embodiment.

FIG. 4 is a block diagram 400 illustrating camera images 405, 410 to be combined. The images are from adjacent cameras with an overlapped field of view resulting in shaded pixels 410 on each display overlapping with each other. The images are combined to form a mosaic image 420 for viewing on a display of the system 100 to provide a wider image than would otherwise be available from a single camera.

Figure 5:
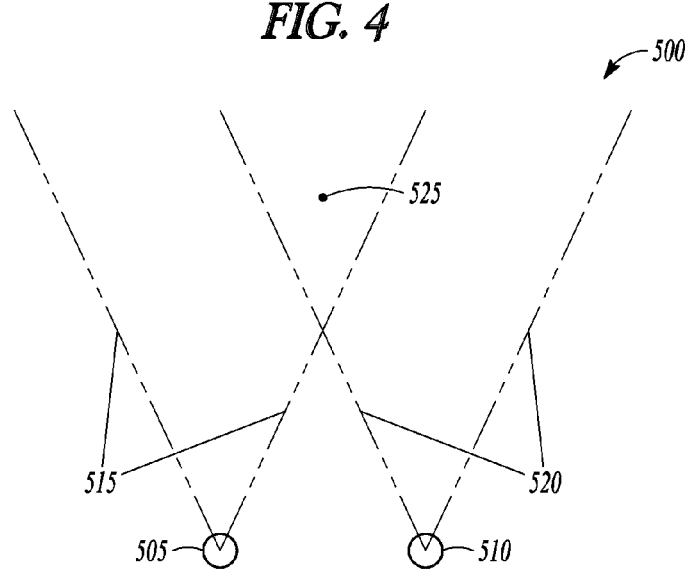
FIG. 5 is a block diagram illustrating two adjacent cameras with near and far focal points according to an example embodiment.

In one embodiment, each micro camera may have a limited variable focusing capability that is accomplished using a micro drive to shift the lens by a small distance. Among the multiple cameras, one or more, such as a subset of cameras may have a far-field focus while one or more, such as a further subset of cameras have near field focus. FIG. 5 at 500 illustrates two adjacent cameras 505 and 510. Camera 505 in this embodiment has a far field focus, with a field of view indicated by vectors 515, while camera 510 has a near field focus with a field of view indicated by vectors 520. Within the area of overlapping FOV as indicated at 525, the far-field focused image is sharper than that of the near field focused image when the visual system 100 is aimed at far distance. The converse is true when the visual system 100 is aimed at a closer distance. Comparison of the sharpness or blurriness of overlapped areas in the far-field and near-field images determines the viewing perspective of the user.

Figure 6:
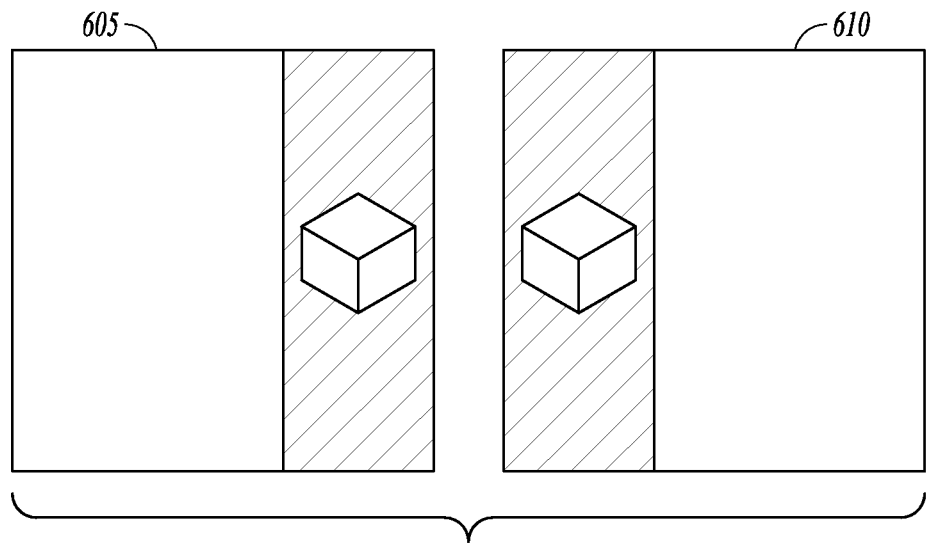
FIG. 6 is a diagram illustrating images from the cameras of FIG. 5 according to an example embodiment.

FIG. 6 at 600 illustrates images 605 and 610 from both cameras 505 and 510. An object 615 appears in image 605 from camera 505, and the same object is illustrated at 620 in the image 610 from camera 510, as the object is positioned in reality in a place where the field of view of both cameras overlaps. Depending on the clarity or sharpness of the object, the image from the camera more in focus may be used to provide correction parameters for generation of a clearer image to a wearer.

In one embodiment, a deblur algorithm, as part of 930, may be applied to the corresponding image such that the fused image (of the far field image and near field camera image) has the correct focus. A sharpness of both images of the object may be evaluated from the separate images to select the image that is more in focus. Further, the resulting image may be adapted to appear in either a near field perspective or a far field perspective as a function of which image was more in focus, corresponding to whether the image was from the near field or far field focused camera. In further embodiments, the overlapped area may utilize the near field camera image if the wearer is sensed as looking down via an accelerometer or other sensor for sensing head orientation, or even sensing where the pupil is looking. The same is applicable for the overlapped image to use the image from the far field of view camera, if the wearer is sensed to be looking straight, parallel to the ground or upwards. In further embodiments, the sharper image for one or more objects or areas of overlap can be selected and used to help sharpen the image from the camera that provides a blurrier image. The sharper and sharpened images may then be mosaicked to provide an overall higher quality image across the combined field of view.

In various embodiments, the use of both a near field and a far field camera for a set of cameras and selection of appropriate camera image or images enables the elimination of autofocus complexities and corresponding delays, further improving the viewability of the images.

In one embodiment, the cameras in the system may be receptive to different spectra including visible, near infrared (NIR), ultraviolet (UV) or other infrared bands. The processor will have capability to perform fusion on images from multi-spectral cameras and perform the required transformation to feed the processed output to the near-to-eye display units.

In one embodiment, the cameras may be arranged such that each camera has a different set of extrinsic and intrinsic parameters, i.e. the cameras may differ in the field of view (FOV), focal length, location and orientation in three dimensions (yaw, pitch and roll) and a combination of such cameras may be used in the system to provide the video input feed for processing. Further, the processor will apply the appropriate transformations to adjust any geometric distortions which may be introduced by the camera configuration.

In further embodiments, the center of field of view of the fused image can be easily determined based on the camera configurations and fusion parameters. To compensate for the difference to the viewing perspective of the eye, a perspective transformation of the fused image is applied such that its center of field of view matches that of the eye pupil. The type of perspective transformation depends on the relative location of the center of field of view of the fused image and the eye. A simple translational transformation is enough if the camera and the eye lie on a plane perpendicular to the forward looking axis. Otherwise, other transformation, e.g., perspective or affine, may be needed.

Figure 7:
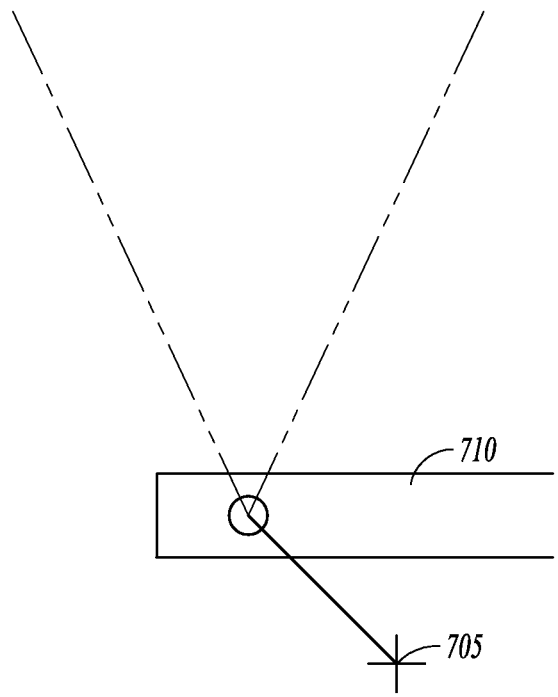
FIG. 7 is a diagram illustrating an affine transformation to shift a center field of view of an image to match a center of pupil in relation to a display according to an example embodiment.

FIG. 7 at 700 illustrates an affine transformation to shift a center field of view of an image to match a center of pupil 705 in relation to a display 710. Displacements both laterally on the display represented as dy, and in depth from the eye to the display represented as dx are utilized to perform the affine transformation.

Figure 8:
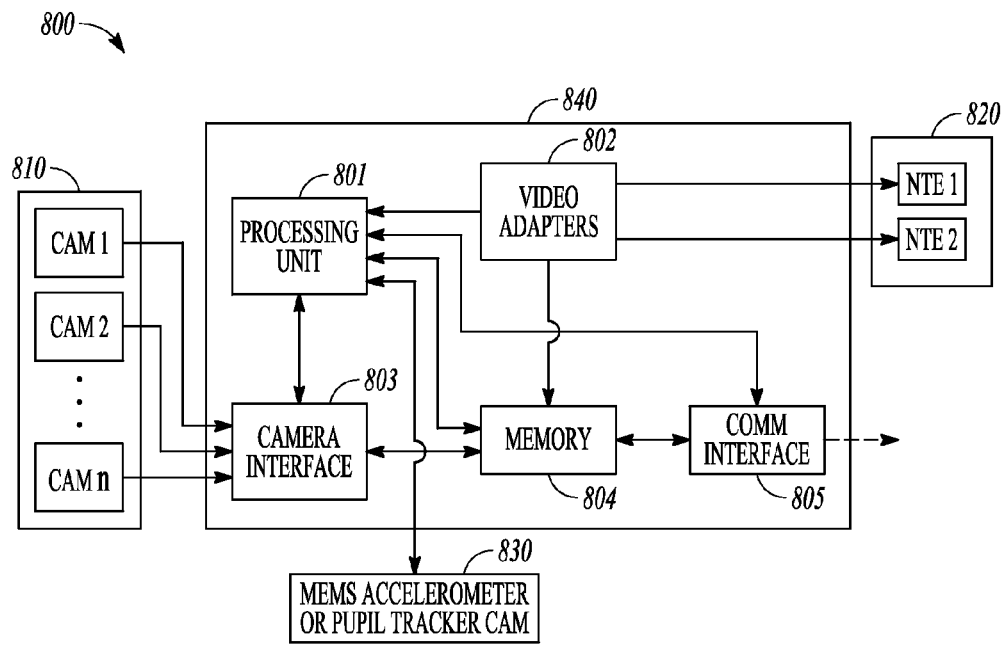
FIG. 8 is the system block diagram illustrating the components for performing methods according to an example embodiment.

FIG. 8 at 800 shows the hardware components which may be used to implement methods described earlier. A unit 840 can be implemented inside the frame containing the cameras and NTE display unit or as wearable processor unit, which communicates with the cameras and near-to-eye displays either by wired or wireless communication. Unit 840 can also be a remote processing unit which communicates with the other components through a communication interface 805. A processing unit 801 performs video and image processing on inputs from multiple cameras 810. The processing unit 801 may include a system controller including a DSP, FPGA, a microcontroller or other type of hardware capable of executing a set of instructions and a computing coprocessor which may be based on an ARM or GPU based architecture. The computing coprocessor will have the capability to handle parallel image processing on large arrays of data from multiple cameras.

As shown in FIG. 8, block 810 represents a set of cameras which provide the input images. The cameras 810, which may differ in both intrinsic and extrinsic parameters, are connected to a camera interface 803. Interface 803 has the capability to connect to cameras with multiple different video configurations, resolutions, and video encode/decode standards. Along with the video adapters 802, the camera interface block 803 may utilize the processing capabilities of processing unit 801 or may have other dedicated processing units. Further, the processing unit, video adapters and cameras will have access to a high speed shared memory 804, which serves as temporary buffer for processing or storing user parameters and preferences.

Embodiments of the system can include a sensor subsystem 830 consisting of MEMS accelerometer and/or pupil tracker camera. The sensor subsystem will have the capability to use the processing unit 801 and the memory 804 for data processing. The outputs from sensor subsystem 830 may be used by the processing unit 801 to perform corrective transformations as needed. Other embodiments of the system also include a communications interface block, 805 which has the ability to use different wireless standards like 802.11 a/b/g/n, Bluetooth, Wimax, NFC among other standards for communicating to a remote computing/storage device or cloud offloading high computation processing from 801.

The block 820 consists of near-to-eye (NTE) display units which are capable of handling monocular, binocular or 3D input formats from video adapter 802 in 840. The NTE units may be implemented using different field of view and resolutions suitable for the different embodiments stated above.

EXAMPLES

1. A visual system comprising:
   a near-to-eye display supported by a frame adapted to be worn by a user such that each display is positioned proximate an eye of a wearer;
   a set of cameras supported by the frame, the cameras having overlapping fields of view; and
   a processor coupled to receive images from the cameras and adapted to integrate and transform images from the set of cameras to provide a fused, corrected image having a wider field of view than an individual camera provides.

2. The visual system of example 1 and further comprising an additional near-to-eye display and set of cameras for a second eye of the user.

3. The visual system of example 2 wherein the sets of cameras have common cameras shared in the two sets.

4. The visual system of any of examples 2-3 wherein a subset of cameras for each display has far field focus and a further subset of cameras for each display has a near field focus.

5. The visual system of any of examples 1-4 wherein the processor is adapted with a corrective transformation that performs combinations of mosaic, fusion, focus determination and correction, view center transform, and camera-display FOV transformation utilizing overlapped areas of the adjacent cameras, auxiliary sensor information and brightness and calibration parameters to provide the image that has optimal brightness, correct focus, wide field of view, and realistic object size for the user.

6. The visual system of any of examples 2-5 and further comprising a sensor subsystem wherein the sensor subsystem provides orientation of the visual system and the pupil position relative to the frame of the visual system, and the processor selects the video feed from the cameras based on the orientation of the visual system and the pupil position relative to the frame of the visual system.

7. The visual system of any of examples 2-6 wherein a subset of cameras in the set of cameras have different intrinsic and extrinsic camera properties including the field of view, focal length, resolution and orientation in space.

8. The visual system of any of examples 2-7 wherein the camera in the sets of cameras is responsive to visible, near infrared, short wave infrared, mid-wave infrared, long-wave infrared or ultraviolet.

9. The visual system of any of examples 2-8 wherein each camera includes a micro drive to provide a small range of auto focal adjustments.

10. The visual system of any of examples 1-9 and further comprising an additional near-to-eye display wherein the output of the processor is fed to both displays for both eyes of the user.

11. A method comprising:
    receiving images from a set of cameras mounted on a frame to be worn by a user; and
    integrating and transforming the received images from the set of cameras to form a fused, corrected image for a near-to-eye display supported by the frame, the fused corrected image having a wider field of view than that provided by an individual camera.

12. The method of example 11, wherein the set of cameras has a near field camera and a far field camera, and wherein the images from each are fused and focus adjusted to display a sharp image on the near-to-eye display.

13. The method of example 12 wherein fusing and correcting the images includes applying a perspective transformation based on a relative location of the user's eyes and the location of the cameras.

14. The method of any of examples 12-13 wherein the images overlap for a portion of adjacent images due to overlapping fields of view of the cameras, the method further comprising determining sharper focus between overlapping portion of the images and integrating the images to form the mosaic image such that the mosaic image is in correct focus for the user.

15. The method of any of examples 11-14 wherein integrating the images includes utilizing overlapped areas of the adjacent cameras and calibration parameters to provide the mosaic image for the display.

16. The method of any of examples 11-15 wherein a subset of cameras in the set of cameras have different intrinsic and extrinsic camera properties including the field of view, focal length, resolution and orientation in space.

17. The method of any of examples 11-16 wherein the camera in the sets of cameras is responsive to visible, near infrared, short wave infrared, mid-wave infrared, long-wave infrared or ultraviolet.

18. The method of any of examples 11-17 wherein each camera includes a micro drive to provide a small range of auto focal adjustments.

19. The method of any of examples 11-18 and further comprising an additional near-to-eye display wherein the output of the processor is fed to both displays for both eyes of the user.

20. The method of any of examples 11-19 and further comprising of a sensor subsystem wherein the sensor subsystem provides orientation of the visual system and the pupil position relative to the frame of the visual system, and the processor selects the video feed from the far field or near field camera based on the orientation of the visual system and the pupil position relative to the frame of the visual system.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A visual system comprising:
   a first near-to-eye display and a second near-to-eye display, the near-to-eye displays supported by a frame adapted to be worn by a user such that each near to eye display is positioned proximate an eye of a wearer;
   a set of cameras supported by the frame, the cameras having overlapping fields of view, the set of cameras including a first camera, a second camera, and a third camera laterally displaced from each other across the frame, the first camera positioned between the second camera and the third camera; and
   a processor coupled to receive images from the cameras and adapted to integrate and transform images from the set of cameras to provide a fused, corrected image having a wider field of view than an individual camera provides,
   wherein the output of the processor is fed to both near-to-eye displays,
   the system configured to detect when a user is looking fax field or near field, the system configured to show images on the near-to-eye displays from the first camera when the user is looking near field and show images on the near-to-eye displays from the second and third cameras when the user is looking far field.

2. The visual system of claim 1 set wherein the set of cameras include a first set of cameras for a first eye of the user and a second of cameras for a second eye of the user.

3. The visual system of claim 2 wherein the sets of cameras have common cameras shared in the two sets.

4. The visual system of claim 2 wherein a subset of cameras for each display has far field focus and a further subset of cameras for each display has a near field focus.

5. The visual system of claim 4 wherein the processor is adapted with a corrective transformation that performs combinations of mosaic, fusion, focus determination and correction, view center transform, and camera-display FOV transformation utilizing overlapped areas of the adjacent cameras, auxiliary sensor information and brightness and calibration parameters to provide the image that has optimal brightness, correct focus, wide field of view, and realistic object size for the user.

6. The visual system of claim 1 and further comprising a sensor subsystem wherein the sensor subsystem provides orientation of the visual system and the pupil position relative to the frame of the visual system, and the processor selects the video feed from the cameras based on the orientation of the visual system and the pupil position relative to the frame of the visual system.

7. The visual system of claim 2 wherein a subset of cameras in the set of cameras have different intrinsic and extrinsic camera properties including the field of view, focal length, resolution and orientation in space.

8. The visual system of claim 2 wherein at least one camera in the sets of cameras is responsive to visible, near infrared, short wave infrared, mid-wave infrared, long-wave infrared or ultraviolet.

9. The visual system of claim 2 wherein each camera includes a micro drive to provide a small range of auto focal adjustments.

10. A visual system comprising:
a first near-to-eye display supported by a frame adapted to be worn by a user, and a second near-to-eye display supported by the frame, the first near-to-eye display and second near-to-eye display configured such that each display is positioned proximate an eye of a wearer;
a set of cameras supported by the frame, the cameras having overlapping fields of view;
wherein the set of cameras include a first camera positioned centrally on the frame, a second camera laterally displaced from the first camera,
a third camera laterally displaced from the first and second cameras; and
a processor coupled to receive images from the cameras and adapted to integrate and transform images from the set of cameras to provide a fused, corrected image having a wider field of view than an individual camera provides
wherein the output of the processor is fed to both displays for both eyes of the user,
the system configured to detect when a user is looking far field or near field,
the system configured to show images from the first camera when the user is looking near field and show images from the second and third cameras when the user is looking far field.

11. A method comprising:
receiving images from a set of cameras mounted on a frame to be worn by a user, the set of cameras including a first camera laterally situated between a second camera and a third camera;
integrating and transforming the received images from the set of cameras to form a fused, corrected image for display on a first near-to eye display and a second near-to-eye display that are supported by the frame and configured such that each display is positioned proximate an eye of a wearer, the fused corrected image having a wider field of view than that provided by an individual camera,
detecting when a user is looking far field or near field,
feeding the output of the processor to the near-to-eye displays
showing images from the first camera when the user is looking near field and showing images from the second and third cameras when the user is looking far field.

12. The method of claim 11 wherein integrating the images includes utilizing overlapped areas of the adjacent cameras and calibration parameters to provide the mosaic image for the display.

13. The method of claim 11 wherein a subset of cameras in the set of cameras have different intrinsic and extrinsic camera properties including the field of view, focal length, resolution and orientation in space.

14. The method of claim 11 wherein a camera in the sets of cameras is responsive to visible, near infrared, short wave infrared, mid-wave infrared, long-wave infrared or ultraviolet.

15. The method of claim 11 wherein each camera includes a micro drive to provide a small range of auto focal adjustments.

16. The method of claim 11 and further comprising of a sensor subsystem wherein the sensor subsystem provides orientation of the visual system and the pupil position relative to the frame of the visual system, and the processor selects the video feed from the far field or near field camera based on the orientation of the visual system and the pupil position relative to the frame of the visual system.

* * * * *